United States Patent
Reissner et al.

(10) Patent No.: US 9,726,441 B2
(45) Date of Patent: Aug. 8, 2017

(54) COGENERATION POWER PLANT AND METHOD FOR OPERATING A COGENERATION POWER PLANT

(71) Applicant: Siemens Aktiengesellschaft, Munich (DE)

(72) Inventors: Florian Reissner, Nuremberg (DE); Jochen Schafer, Nuremberg (DE)

(73) Assignee: Siemens Aktiengesellshcaft, Munich (DE)

( * ) Notice: Subject to any disclaimer, the term of this patent is extended or adjusted under 35 U.S.C. 154(b) by 251 days.

(21) Appl. No.: 14/430,351

(22) PCT Filed: Sep. 12, 2013

(86) PCT No.: PCT/EP2013/068897
§ 371 (c)(1),
(2) Date: Mar. 23, 2015

(87) PCT Pub. No.: WO2014/053292
PCT Pub. Date: Apr. 10, 2014

(65) Prior Publication Data
US 2015/0226500 A1    Aug. 13, 2015

(30) Foreign Application Priority Data
Oct. 1, 2012   (DE) .................. 10 2012 217 929

(51) Int. Cl.
| F28F 27/00 | (2006.01) |
| F25B 29/00 | (2006.01) |
| F01K 17/00 | (2006.01) |
| F01K 9/00 | (2006.01) |
| F01K 17/02 | (2006.01) |

(Continued)

(52) U.S. Cl.
CPC ............ *F28F 27/003* (2013.01); *F01K 9/003* (2013.01); *F01K 17/005* (2013.01); *F01K 17/02* (2013.01); *F02G 5/02* (2013.01); *F25B 29/00* (2013.01); *G05B 15/02* (2013.01); *Y02E 20/14* (2013.01); *Y02P 80/15* (2015.11)

(58) Field of Classification Search
CPC ...... F28F 27/003; F25B 29/00; F01K 17/005; F01K 9/003; F01K 17/02; F02G 5/02; G05B 15/02; Y02P 80/15; Y02E 20/14
USPC .................... 60/643, 655, 659, 670
See application file for complete search history.

(56) References Cited

U.S. PATENT DOCUMENTS

| 2,982,864 A | | 5/1961 | Furreboe |
| 4,089,744 A | * | 5/1978 | Cahn .............. F01K 3/006 376/322 |

(Continued)

FOREIGN PATENT DOCUMENTS

| DE | 3034500 A1 | 4/1982 |
| DE | 3327752 A1 | 2/1985 |

(Continued)

*Primary Examiner* — Hoang Nguyen
(74) *Attorney, Agent, or Firm* — Beusse Wolter Sanks & Maire

(57) ABSTRACT

A cogeneration power plant and a method for operating a cogeneration power plant are provided, with a working medium being additionally cooled by a suitable heat pump between an outlet of a thermal heating device and an inlet of a power generator of the cogeneration process. The thermal power obtained in this manner is again available for heating purposes within the heat cycle.

17 Claims, 2 Drawing Sheets

(51) Int. Cl.
*F02G 5/02* (2006.01)
*G05B 15/02* (2006.01)

(56) References Cited

U.S. PATENT DOCUMENTS

| | | | | |
|---|---|---|---|---|
| 4,213,563 A | * | 7/1980 | van Kuijk | F24J 2/402 |
| | | | | 126/585 |
| 4,283,914 A | * | 8/1981 | Allen | F03G 6/06 |
| | | | | 126/584 |
| 4,437,316 A | * | 3/1984 | Dyer | B01D 1/2884 |
| | | | | 62/238.4 |
| 5,809,791 A | * | 9/1998 | Stewart, III | F01K 25/08 |
| | | | | 60/655 |
| 2011/0036091 A1 | | 2/2011 | Hoffman | |
| 2011/0252796 A1 | * | 10/2011 | Burkhart | F01K 27/00 |
| | | | | 60/641.2 |

FOREIGN PATENT DOCUMENTS

| | | |
|---|---|---|
| DE | 2612058 C2 | 10/1985 |
| DE | 102008038351 A1 | 2/2010 |
| DE | 102009031238 A1 | 1/2011 |
| EP | 0613518 B1 | 8/1995 |
| EP | 2400120 A1 | 12/2011 |
| WO | 2012049259 A1 | 4/2012 |

* cited by examiner

COGENERATION POWER PLANT AND METHOD FOR OPERATING A COGENERATION POWER PLANT

CROSS REFERENCE TO RELATED APPLICATIONS

This application is the US National Stage of International Application No. PCT/EP2013/068897 filed Sep. 12, 2013, and claims the benefit thereof. The International Application claims the benefit of German Application No. DE 102012217929.1 filed Oct. 1, 2012. All of the applications are incorporated by reference herein in their entirety.

FIELD OF INVENTION

The present invention relates to a cogeneration power plant and to a method for operating a cogeneration power plant. In particular, the present invention relates to a cogeneration power plant with a heat pump and to the operation of a cogeneration power plant with such a heat pump.

BACKGROUND OF INVENTION

DE 10 2008 038 351 A1 discloses a power plant with a heat pump. A working medium is vaporized in a boiler, whereupon it drives a turbine. Then, the working medium is first cooled by means of a heat pump, then supplied to a pump and finally once again heated by the heat pump before it once again reaches the boiler.

DE 30 34 500 A1 describes a heat pump without a compressor, to be installed in a steam power plant.

U.S. Pat. No. 2 982 864 A relates to a heat circuit for a power plant, using the thermal energy produced therein.

Even today, electrical energy is largely generated by means of thermal power stations. Such thermal power stations use fuels such as coal, natural gas, biogas, oil, wood or wood products. Such thermal power stations may operate according to a thermodynamic Clausius-Rankine cycle. In that context, a working medium, for example water, is heated such that it transitions from a liquid state to a gaseous state and thus drives a turbine. Since the working medium is still at a relatively high temperature at the turbine outlet, it must first be cooled and condensed before it can again be heated and vaporized in the cycle. If the heat extracted during the cooling process is given off to the environment, this power plant has a relatively poor degree of utilization.

In order to increase the efficiency of the system as a whole, therefore, the heat present at the turbine outlet is in addition used for heating purposes. The consumers in the heat circuit thus support the cooling of the working medium such that, on one hand, less energy need be given off unused to the environment and, on the other hand, the additional energy requirement for cooling the working medium in the power plant can be reduced. For that reason, such a cogeneration power plant is markedly more efficient than a power plant which serves exclusively for the generation of electrical energy.

In the case of relatively high outward-flow temperatures in the heating circuit, the return-flow temperatures in the heating circuit can still be high enough that the working medium has to be additionally cooled before the working medium can again be used for steam generation. On one hand, this additional cooling requires the use of extra energy and, on the other hand, the remaining heat energy of the carrier medium is lost, unused.

Moreover, there is normally a need for heat on the consumer side of the heating circuit, which need only very seldom corresponds to the quantity of heat which is produced when generating electrical energy. In the majority of cases, the quantity of heat from generating electrical energy differs substantially over time from the quantity of heat which is required by the thermal consumers of the heat circuit.

If, in the case of relatively high demand for electrical energy, only a relatively small quantity of heat is removed by the consumers, the additional excess thermal energy has to be given off unused to the environment while using further energy for the cooling process. If, conversely, the demand for heat on the side of the thermal consumers in the heating circuit is greater than the quantity of heat which can be provided by generating electrical energy, the demand for heat cannot be satisfied and additional heat energy has to be provided by other means and fed into the heating circuit.

There is therefore a need for a cogeneration power plant in which also the residual thermal energy from the return of the heating circuit can be used as efficiently as possible.

There is furthermore a need for a cogeneration power plant in which the outward flow of the heating circuit can always be supplied with a sufficient quantity of thermal energy.

Moreover, there is also a need for a cogeneration power plant with higher overall efficiency.

SUMMARY OF INVENTION

This is achieved with the features of the independent patent claims.

One idea of the present invention is to cool the return flow from the heating device of a cogeneration power plant by means of a heat pump to such an extent that it is at a low enough temperature for the forward flow of a process for generating electrical or mechanical energy. It is thus no longer necessary to cool the working medium further by means of cooling towers or by giving off heat to an adjacent watercourse.

A substantial advantage of the present invention lies in the fact that the quantity of heat which is produced in the system as a whole can be used particularly effectively. The return flow of the heating device can be cooled by means of the heat pump to such an extent that it can in turn be immediately supplied to the subsequent process for the generation of electrical or mechanical energy. Further cooling by means of cooling towers or for example an adjacent watercourse is thus no longer necessary.

A further advantage lies in the fact that the quantity of heat removed by means of the heat pump can in turn be used to good effect at another location. In contrast to a cooling process in which the heat is given off to the environment, it is thus possible to achieve a further rise in the overall efficiency.

Of particular advantage is furthermore that, by using a heat pump according to the invention, it is also possible to even out variations in the event of an imbalance between on one hand the electrical or mechanical energy generated and on the other hand the demand for heat in the heating device.

In one embodiment, the working medium heated by the heat pump is at a temperature above 70 degrees Celsius. Advantageously, the temperature of the working medium heated by the heat pump is above 100 degrees Celsius, particularly for example above 115 degrees Celsius. By heating the working medium to such a high temperature, it is possible to achieve an outward-flow temperature for the heating device which permits a particularly propitious supply to the heating device.

In one embodiment of the present invention, the volume flow rate of the working medium which is cooled by the heat pump is smaller than the volume flow rate of the working medium which is heated by the heat pump. This imbalance between the two volume flow rates thus also results in differences in the rise or, respectively, drop in the temperature of the working medium in the outward and return flows. Thus, even with just a relatively small temperature drop between the outlet of the heat circuit and the inlet of the energy generator, it is still possible to achieve a relatively large temperature rise on the other side of the heat pump. It is thus possible for the temperature of the outward flow of the heat circuit to be raised by means of the heat pump.

In one embodiment of the present invention, the cogeneration power plant according to the invention comprises at least one thermal storage unit. By using such thermal storage units, the heat energy in the system as a whole can be stored for a determined period. It is thus possible for excess thermal energy from generating the electrical energy to be stored for a later time and is then available for heating purposes, even if at that point demand for electrical energy is only small.

Advantageously, the thermal storage unit is a thermal storage unit with a phase-change medium. Such a thermal storage unit with a phase-change medium allows relatively large quantities of thermal energy to be stored in a relatively small volume.

In one embodiment, the heat pump is a high-temperature heat pump. Such high-temperature heat pumps are able to achieve a relatively high temperature of above 90 degrees Celsius on the heat-output side. These temperatures in turn allow an outward flow for the heat circuit to be raised to a particularly efficient level.

In one embodiment, the energy generator generates electrical energy. Electrical energy cannot be stored, or is at least very difficult to store. For that reason, it is necessary to generate the electrical energy precisely at the time when it is to be used. The thermal energy produced in the process can, according to the invention, be used particularly efficiently. It is thus also possible for the thermal energy to be used efficiently even if at that time there is not the same demand for electrical and thermal energy.

In one particular embodiment, the heat pump is operated independently of the energy generator. The heat pump can therefore also lower the return flow of the heat circuit and raise the outward flow accordingly, even if at that point no or very little electrical energy is being generated.

Particularly, the method according to the invention further comprises a step of storing the thermal energy given off by the heat pump. By virtue of this storage of the thermal energy in one or more thermal energy storage units, it is in particular possible to equalize even a relatively large imbalance between the generation of electrical or mechanical energy and the demand for thermal energy.

The method advantageously comprises a step of storing thermal energy, between a heating device and a heat pump. This stored thermal energy also serves for equalizing purposes in the case of varying demand for heat.

BRIEF DESCRIPTION OF THE DRAWINGS

Further features and advantages of embodiments of the invention can be gleaned from the description below with reference to the attached drawings.

Brief description of the drawings, in which.

DETAILED DESCRIPTION OF INVENTION

Figure 1:
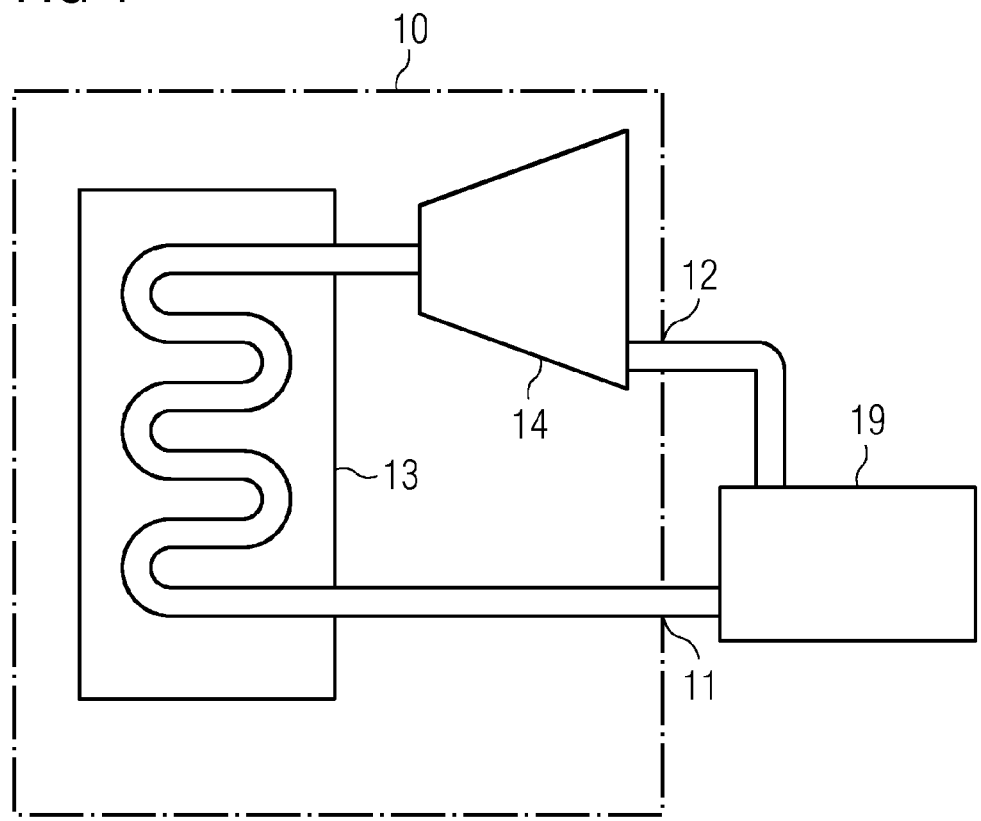
FIG. 1 is a schematic representation of a thermal process for generating energy.

The orienting terms used in the following, that is to say terms such as 'left', 'right', 'up', 'down', 'in front of', 'behind' and the like, serve merely to better understand the drawings and are in no way intended to represent a restriction of the general nature of the invention. Identical reference signs generally denote components which are similar or which have a similar effect. For reasons of clarity, the elements represented in the figures are not necessarily depicted to scale. The configuration and use of the components and elements represented in the figures may vary and may be adapted to the respective uses within the scope of the considerations of a person skilled in the art.

Energy generators within the meaning of the present invention are all types of devices which provide energy, for example in the form of a mechanical movement or in the form of electrical energy. For example, an energy generator can be a turbine which is made to move in rotation. This rotation can then be used as a drive for further devices, in particular for driving a generator for generating electrical energy. Further devices for providing a form of mechanical energy, in particular rotation or the like, are also possible. Fundamentally, an energy generator further comprises, within the scope of the present invention, such devices which can directly provide electrical energy. In order to provide this energy by means of an energy generator, within the scope of the present invention, a thermal process takes place. One example of such a thermal process is combustion. Further thermal processes, for example radioactive decay or an exothermic chemical reaction, are also possible.

A heating device within the scope of the present invention is a device through which there flows a heat carrier medium and which then gives off thermal energy to a consumer. A heating device within the scope of the present invention can for example be a district heating network. Such a district heating network is supplied by a heat source, for example in the power plant. The thermal energy generated is thus supplied to a thermal consumer. A thermal consumer, for example a central heating system or the like, removes thermal energy from a heat carrier medium and thus cools the heat carrier medium. Heating devices within the scope of the present invention are also further heating devices, for example for heating in conjunction with industrial processes or the like.

Cogeneration power plants within the scope of the present invention are all power plants in which, in addition to a process for providing mechanical or electrical energy, thermal energy is also produced and at least some of this thermal energy is then also used. In particular, a cogeneration power plant within the scope of the present invention comprises the combination of an energy generator as described above with a heating device as described previously. For example, a cogeneration power plant within the scope of the present invention is a power plant for generating electrical energy which feeds at least some waste heat into a district heating network or provides it for other heating purposes.

Working media within the scope of the present invention are all types of medium which are able to take up and transport thermal energy. In particular, examples of working media within the scope of the present invention are fluids which flow in a line system and in so doing transport thermal energy from one point to another. Such a working medium can for example be water.

FIG. 1 shows a schematic representation of a Clausius-Rankine process. A working medium, for example water, is supplied to an inlet 11 of an energy generator 10. The working medium is first heated in a boiler 13. In that context, the working medium transitions from a liquid state to a gaseous state. The vaporous working medium issues forth from the boiler 13, whereupon it drives a turbine 14. The turbine is then made to rotate and can for example drive a generator for generating electrical energy. After the gaseous working medium has flowed through the turbine 14, it exits the energy generator 10 at the outlet 12 and is cooled in the cooling device 19 before it is once again supplied to the energy generator 10 at the inlet 11.

In the case of a pure electricity power plant, the thermal energy extracted from the working medium in the cooling device 19 is given off, unused, to the environment. Alternatively, this thermal energy can also be used for heating purposes in the manner of a power-heat coupling.

Figure 2:
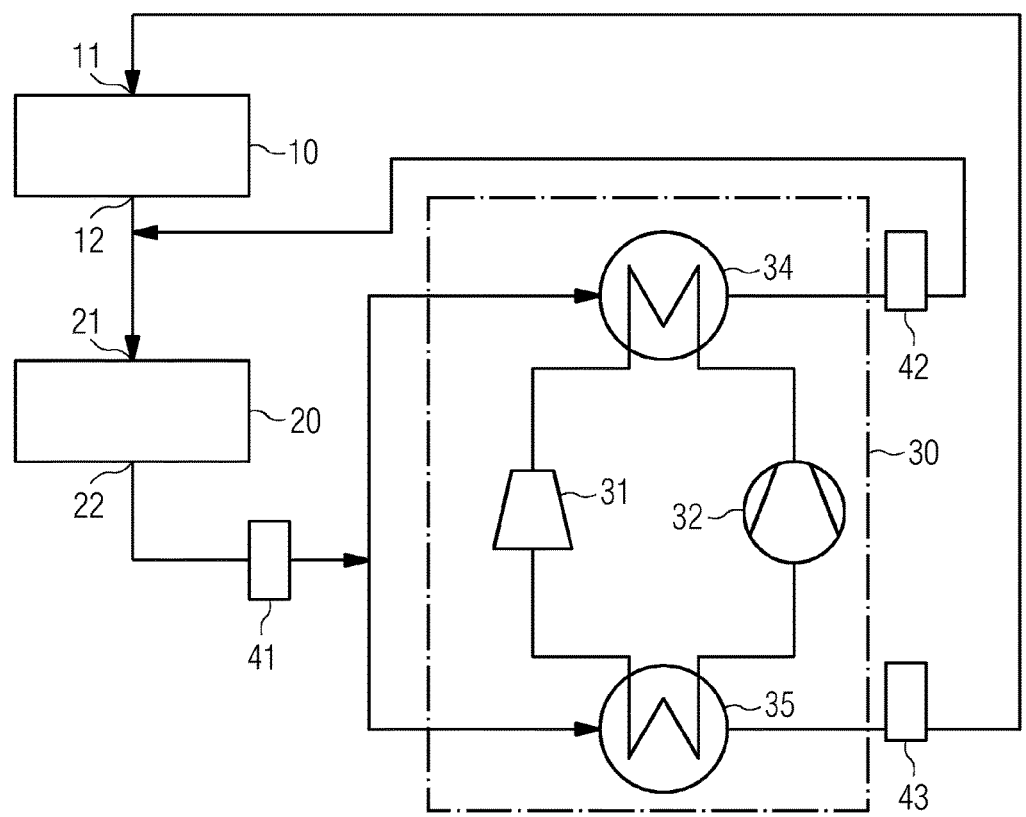
FIG. 2 is a schematic representation of a cogeneration power plant according to one embodiment of the present invention.

FIG. 2 shows, schematically, a cogeneration power plant according to one embodiment of the present invention. The working medium is supplied to the energy generator 10 at the inlet 11. For example, this energy generator can be an electricity power plant which generates electrical energy in accordance with the above-described Clausius-Rankine process via a turbine 14 and a generator coupled thereto.

For example, in that context, the working medium can be heated and vaporized by burning fossil energy carriers such as coal, petroleum or natural gas, or alternative energy carriers such as biogas or wood. Alternative thermal processes, for example by means of radioactive decay, chemical reactions or the like, are also possible.

After the working medium flows through a turbine and has, in the process, driven the latter, or the desired energy form has been provided in an alternative manner, the working medium leaves the energy generator 10 at the outlet 12. The working medium is then, at this outlet 12, still at a temperature which is higher than the temperature of the working medium at the inlet 11 of the energy generator 10.

In order that this excess thermal energy of the working medium need not be given off, unused, to the environment, the working medium is supplied to a thermal heating device 20. The outward-flow temperature at the inlet 21 of the heating device 20 is, in that context, approximately 115 degrees Celsius. Depending on the application, temperatures in the region of 100 to 130 degrees Celsius, possibly also temperatures between 85 and 150 degrees Celsius, are also possible.

The working medium then flows through the heating device 20. In that context, consumers operating in the heating device 20 can extract thermal energy from the working medium. It is thus possible to heat consumers located within the heating device 20.

After the working medium has flowed through the heating device 20, it exits at the outlet 22 of the heating device 20. At this point, the working medium commonly has a return-flow temperature of approximately 90 degrees Celsius. Depending on the outward-flow temperature used and on the energy decrease within the heating device 20, the return-flow temperatures at the outlet of the heating device thus vary between 75 and 100 degrees Celsius. Depending on the application, return-flow temperatures between 60 and 120 degrees Celsius are also possible.

In the case of relatively high outward-flow temperatures at the inlet 21 of the heating device 20, and/or in the case of very low thermal energy decrease within the heating device 20 by means of the connected consumers, it is possible for the return-flow temperature of the heating device 20 to be higher than the required outward-flow temperature at the inlet 11 of the energy generator 10. In order to further lower the temperature of the working medium between the outlet 22 of the heating device 20 and the inlet 11 of the energy generator 10, the working medium is therefore further cooled by means of the heat pump 30. To that end, the working medium is fed through the evaporator 35 of the heat pump 30. In that context, thermal energy is extracted from the working medium by means of the heat pump 30 and the heat carrier medium is cooled to the desired outward-flow temperature of the energy generator 10.

In that context, the working medium should advantageously be cooled to a temperature of approximately 75 degrees Celsius. Depending on the application, temperatures between 60 and 90 degrees Celsius are also possible. Moreover, in certain applications, temperatures of the cooled working medium between 50 and 100 degrees Celsius are also possible.

By cooling the working medium with the aid of the heat pump 30, the thermal energy thus extracted is not given off, unused, to the environment but remains available for use at another location. It is thus for example possible, as will be explained in more detail below, for the outward-flow temperature of the heating device 20 to be raised. Alternative uses and fields of application for the thermal energy, which can thus be provided by means of the heat pump 30, are also possible.

In order to raise the outward-flow temperature at the inlet 21 of the heating device 20, it is for example possible in that context for the condenser 34 of the heat pump 30 to be directly coupled (not shown) in the flow of the working medium between the outlet 12 of the energy generator 10 and the inlet 21 of the heating device 20.

Alternatively, it is also possible to split the flow of the working medium after the outlet 22 of the heating device 20. Thus, some of the working medium is cooled to the desired outward-flow temperature of the energy generator 10 by means of the evaporator 35. Another portion of the working medium is supplied to the condenser 34 of the heat pump 30 and is thus raised to a higher temperature. The portion of the working medium heated in this manner is then mixed with the heat carrier medium coming from the energy generator 10 and, together, these are supplied to the inlet 21 of the heating device 20.

Alternatively, it is also possible to separate parts of the described circuit of the working medium, such that different media flow through the respective regions. For example, a first working medium can be used within the energy generator 10 while a further working medium or heat carrier medium flows through the heating device 20. Coupling the individual circuits is in this case effected by means of a suitable heat transfer means.

In that context, the mass flow rates at the evaporator 35 and at the condenser 34 of the heat pump 30 need not necessarily correspond. It is also possible that different mass flow rates of the working medium flow past the evaporator 35 and the condenser 34. If, for example, the working medium is to be cooled by only a relatively small temperature value at the evaporator 35, whereas the working medium is to be raised by a larger temperature difference at the condenser 34, this can be compensated for in that a larger mass flow rate is made to flow past the evaporator 35 and an accordingly smaller mass flow rate of the working medium is heated at the condenser 34.

It is thus for example possible for the evaporator 35 to cool the working medium by only 15 Kelvin, while the condenser 34 heats the working medium flowing past it by 25 Kelvin or more. As an alternative, it is of course fundamentally also possible to cool a small mass flow rate by a large temperature difference at the evaporator 35 and, at the same time, to heat a larger mass flow rate by only a small temperature difference at the condenser 34.

As described above, a particularly flexible configuration and raising or, as the case may be, lowering of the respective temperature is possible such that, for the respective application, a best possible division of the volume flow rates of the working medium with the associated temperature increases and decreases is always possible.

Moreover, the construction according to the invention can be made even more flexible by integrating one or more thermal storage units 41, 42 and 43 in the circuit of the working medium. Such thermal storage units 41, 42 and 43 are able to take up and store heat energy. Simple embodiments of such a thermal storage unit comprise for example a storage medium which is heated or cooled. Later, a liquid or gaseous heat carrier medium can be made to flow through this storage medium, and thus heat or cool this heat carrier medium. For example, in the simplest case such a thermal storage unit can comprise a large tank with water or an oil.

Alternative and more efficient thermal storage units, however, comprise substances which are not only easy to heat or cool, but in which the state of aggregation of the storage medium also changes. Phase-change materials (PCMs) of this type commonly include specific substances or paraffins which take up a lot of heat energy. The advantage of this thermal storage technology resides in being able to store a lot of heat energy in a small temperature range which is determined by the melting temperature of the storage material used.

Such a thermal storage element 41 can for example be arranged downstream of the outlet 22 of the heating device 20, in order to temporarily store a portion of the thermal energy from the return flow of the heating device 20 in the event of a relatively high return-flow temperature, for example due to only low heat decrease or a relatively high outward-flow temperature. Moreover, a further thermal energy storage unit 42 can be arranged between the condenser 34 of the heat pump 30 and the inlet 21 of the heating device 20. This heat storage unit 42 allows two-part storage of thermal energy in case the heat pump 30 gives off more heat energy via the condenser 34 than is required in the heating device 20. Moreover, a third thermal storage unit 43 may be arranged between the evaporator 35 of the heat pump 30 and the inlet 11 of the energy generator 10. This thermal storage unit 43 may for example, in the event of above-average cooling of the working medium by the evaporator 35, equalize this cooling in two parts and then later, if the working medium is not cooled as much by the evaporator 35, take up the excess heat energy and thus cool the working medium to the desired temperature.

Known heat pumps, for example steam compression heat pumps with a compressor 32 and an expansion valve 31, can be used for cooling and heating the working medium. Of course, other types of heat pump are fundamentally possible provided that they are able to heat or cool the necessary volume flow rates of the working medium to the required temperatures.

However, in order to achieve, at the condenser side of the heat pump, a sufficiently high temperature for the outward flow of the heating device, special high-temperature heat pumps are required. These high-temperature heat pumps are able to raise the heat carrier medium, at the condenser side, to temperatures of 115 degrees Celsius, depending on the application also 130 or 150 degrees Celsius or possibly even up to 180 degrees Celsius.

Figure 3:
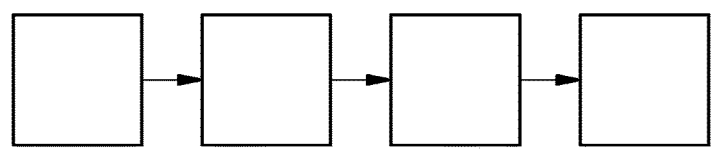
FIG. 3 is a schematic representation of a method for operating a cogeneration power plant according to one embodiment of the present invention.

FIG. 3 shows an embodiment for a method for operating a power plant with power-heat coupling. There, a working medium is first heated in the energy generator 10. After the heated working medium has left the energy generator 10, the working medium flows through a heating device 20. There, the working medium cools down. The return-flow temperature at the outlet 22 of the heating device 20 can vary depending on the outward-flow temperature at the inlet 21 of the heating device 20 and on the heat decrease within the heating device 20. The working medium is then at least partially additionally cooled by means of a heat pump 30. Subsequently, the working medium cooled in this manner is supplied to the inlet 11 of the energy generator 10. Thus, the working medium can be cooled to the outward-flow temperature required for the energy generator 10 without the need to give off thermal energy to the environment.

In a special embodiment of the present invention, part of the working medium is heated by the heat pump after the working medium has flowed through the heating device 20 and has exited at the outlet 22. This heated working medium is then once again supplied to the inlet 21 of the heating device 20 and is thus once again available for heating purposes. In this manner, the heat energy which would have been extracted from the working medium for cooling the outward flow for the energy generator 10 is used again for heating purposes and is therefore not lost.

In order to have to give off as little energy to the environment as possible, even in the case of only low heat decrease within the heating device 20, thermal energy which is given off by the heat pump is temporarily stored in one or more thermal storage units 41, 42 and 43 in times of only low heat demand in the heating device 20. The thermal energy temporarily stored in this manner is then available for later use if the heat requirement of the consumers in the heating device 20 is higher, but on the other hand the energy generator 10 gives off only a little heat.

In summary, the present invention relates to a cogeneration power plant and to a method for operating a cogeneration power plant, in which a working medium is additionally cooled, by means of a suitable heat pump 30, between an outlet 22 of a thermal heating device 20 and an inlet 11 of an energy generator 10 of the power-heat coupling. The thermal energy obtained in this manner is then once again available for heating purposes within the thermal heating device 20.

The invention claimed is:

1. A cogeneration power plant, comprising:
   a heating device comprising an inlet into which a working medium flows, and an outlet out of which the working medium flows, and configured to extract heat from the working medium;
   an energy generator comprising an inlet into which the working medium flows, and an outlet out of which the working medium flows;
   a heat pump; and
   a circuit configured to deliver the working medium from the energy generator to the heating device, and then to split the working medium into a first flow that is delivered to the heat pump and returned to the inlet of the energy generator and a second flow that is delivered to the heat pump and returned to the inlet of the heating device;

wherein the heat pump is configured to cool the first flow of the working medium; and wherein the heat pump is configured to heat the second flow of the working medium.

2. The cogeneration power plant as claimed in claim 1, wherein the working medium heated by the heat pump is heated to a temperature above 70 degrees Celsius.

3. The cogeneration power plant as claimed in claim 1, wherein a mass flow rate of the working medium which is cooled by the heat pump is smaller than a mass flow rate of the working medium which is heated by the heat pump.

4. The cogeneration power plant as claimed in claim 1, further comprising a thermal storage unit disposed between the heating device and the heat pump in the circuit.

5. The cogeneration power plant as claimed in claim 4, wherein the thermal storage unit comprises a phase-change medium.

6. The cogeneration power plant as claimed in claim 1, wherein the heat pump is a high-temperature heat pump.

7. The cogeneration power plant as claimed in claim 1, wherein the energy generator generates electrical energy.

8. The cogeneration power plant as claimed in claim 1, wherein the heat pump is operated independently of the energy generator.

9. A method for operating a cogeneration power plant, comprising:

heating a working medium in an energy generator;

delivering the working medium from the energy generator to a heating device;

extracting heat from the working medium in the heating device;

delivering the working medium from the heating device to a heat pump via a first stream of the working medium and a second stream of the working medium;

cooling the first stream of the working medium by means of the heat pump and then returning the first stream to the energy generator;

heating the second stream of the working medium by means of the heat pump and then returning the second stream to the heating device.

10. The method as claimed in claim 9, further comprising storing thermal energy given off by the heat pump.

11. The method as claimed in claim 9, further comprising storing thermal energy, between the heating device and the heat pump.

12. The cogeneration power plant as claimed in claim 1, wherein the working medium heated by the heat pump is heated to a temperature above 100 degrees Celsius.

13. The cogeneration power plant as claimed in claim 1, wherein the working medium heated by the heat pump is heated to a temperature above 115 degrees Celsius.

14. The cogeneration power plant as claimed in claim 1, the heat pump further comprising an evaporator configured to cool the first flow.

15. The cogeneration power plant as claimed in claim 1, the heat pump further comprising a condenser configured to heat the second flow.

16. The method as claimed in claim 9, further comprising using an evaporator of the heat pump to cool the first stream.

17. The method as claimed in claim 9, further comprising using a condenser of the heat pump to heat the second stream.

* * * * *